(No Model.)
W. E. LINCOLN.
MILK SKIMMER.
No. 261,241. Patented July 18, 1882.
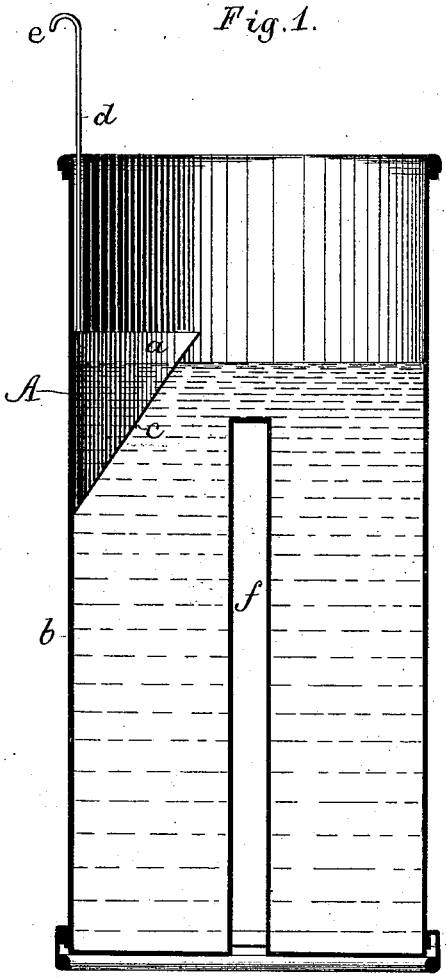
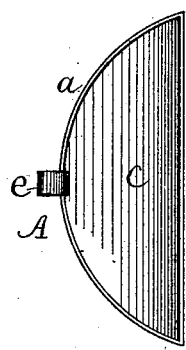
Witnesses.
John F. C. Frankfurt
Fred A. Powell
Inventor:
William E. Lincoln.
by Crosby & Gregory
Attys.

UNITED STATES PATENT OFFICE.

WILLIAM E. LINCOLN, OF WARREN, MASSACHUSETTS.

MILK-SKIMMER.

SPECIFICATION forming part of Letters Patent No. 261,241, dated July 18, 1882.

Application filed May 11, 1882. (No model.)

*To all whom it may concern:*

Be it known that I, WILLIAM E. LINCOLN, of Warren, Worcester county, State of Massachusetts, have invented an Improvement in Milk-Skimmers, of which the following description, in connection with the accompanying drawings, is a specification.

My invention relates to a device for removing the upper portion of a fluid without disturbing the lower portion thereof, as is required in removing cream from the surface of a body of milk. This has been previously accomplished in some instances by depressing a vessel or skimmer into the liquid from above by means of a suitable handle, the upper portion of the said liquid flowing over the edges of the said skimmer, which thus removes the upper or surface portion only of the liquid in which it is immersed.

Heretofore vessels conical in shape or having all their sides at the same angle to the surface of the liquid have been employed, and when such a vessel is immersed in the body of the liquid surrounding it on all sides the pressure or buoyant effect of the said liquid makes it difficult to keep the said skimmer steady, and one portion of its edge will be immersed deeper than the rest, so that the liquid in which it is immersed is disturbed, and more than the surface portion removed, it being almost impossible for the operator to hold it with sufficient steadiness.

The present invention consists in a skimmer having one of its walls substantially vertical and shaped to fit the vessel containing the liquid to be skimmed, the skimmer having its opposite wall inclined upward and outward from the wall that fits the vessel toward the mouth or open top of the skimmer. By this arrangement the buoyant effect of the liquid in acting on the inclined wall presses the skimmer bodily toward the wall of the vessel containing the liquid, and the wall of the said skimmer, coinciding with or fitting the wall of the vessel containing the liquid, guides and steadies it in its downward movement into the liquid, which will be displaced or forced away from the wall of the vessel against which the skimmer is pressed and guided, and will ultimately flow over the edge of the inclined wall of the skimmer in a uniform manner, easily controlled by the operator.

Figure 1 shows in side elevation a skimmer embodying this invention, it being used in connection with a cylindrical can; and Fig. 2 is a top view of the said skimmer.

The skimmer consists of a vessel, A, having a vertical wall, $a$, of proper shape to fit the side of the vessel or can $b$ with which it is intended to be used, and having an inclined wall, $c$, forming the other side of the said vessel A, which is provided with a handle, $d$, having a curved head, $e$, by which it can be hung upon the edge of the can when not in use. When the said skimming-vessel A is forced downward into the fluid in the can $b$ its wall $a$ is guided by the side of the can, and the buoyant effect upon the said fluid in acting on the inclined wall $c$ of the skimmer tends to press its said curved side or guiding-wall $a$ against the side of the can $b$, by which the said skimmer will be guided steadily in its downward movement into the said liquid, which will be displaced or removed from the side of the can $b$, against which the skimmer rests, and will flow over the edge of the inclined wall $c$ into the skimmer, the said edge being kept horizontal, so that the liquid flows uniformly over its entire length.

The can $b$ is shown as provided with a channel, $f$, for the circulation of the cooling-fluid into which the can is immersed, in order to separate the cream from the milk, and the skimmer is made of such size that it can enter the space at either side of the said channel to remove the cream therefrom in case the cream does not rise above the top of the said channel.

The shape and dimensions of the skimmer will be varied to suit the different cans with which it is to be used, the essential feature being that it has a vertical wall fitted to some portion of the interior surface of the vessel containing the liquid to be skimmed, and an inclined wall opposite to the said vertical guiding-wall, by which the buoyant effect of the liquid tends to keep the said guiding-wall in engagement with the side of the wall while the skimmer is being forced down into the liquid therein.

I claim—

As an improved article of manufacture, the herein-described skimmer, it having a guiding-wall shaped to fit and be guided by the wall of the vessel containing the liquid to be skimmed, and an inclined wall opposite to the said guiding-wall, substantially as and for the purpose described.

In testimony whereof I have signed my name to this specification in the presence of two subscribing witnesses.

WILLIAM E. LINCOLN.

Witnesses:
JOS. P. LIVERMORE,
W. H. SIGSTON.